United States Patent
Lindholm et al.

(10) Patent No.: US 8,811,288 B2
(45) Date of Patent: Aug. 19, 2014

(54) METHOD FOR ENABLING DELIVERY OF A MESSAGE BETWEEN AN IMS DOMAIN AND A CS DOMAIN

(75) Inventors: Fredrik Lindholm, Stockholm (SE); Ralf Keller, Würselen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 109 days.

(21) Appl. No.: 13/501,428

(22) PCT Filed: Oct. 14, 2009

(86) PCT No.: PCT/SE2009/051169
§ 371 (c)(1),
(2), (4) Date: May 22, 2012

(87) PCT Pub. No.: WO2011/046476
PCT Pub. Date: Apr. 21, 2011

(65) Prior Publication Data
US 2012/0236797 A1    Sep. 20, 2012

(51) Int. Cl.
*H04W 4/12* (2009.01)
*H04W 8/26* (2009.01)
*H04W 76/02* (2009.01)

(52) U.S. Cl.
CPC .............. *H04W 8/26* (2013.01); *H04W 76/021* (2013.01)
USPC .......................................... 370/328; 370/352

(58) Field of Classification Search
None
See application file for complete search history.

(56) References Cited

U.S. PATENT DOCUMENTS

| | | | |
|---|---|---|---|
| 2007/0186108 A1* | 8/2007 | Passarella et al. | 713/171 |
| 2007/0254625 A1* | 11/2007 | Edge | 455/404.1 |
| 2008/0080480 A1* | 4/2008 | Buckley et al. | 370/352 |
| 2009/0086725 A1* | 4/2009 | Lai et al. | 370/352 |
| 2010/0087215 A1* | 4/2010 | Gu et al. | 455/466 |
| 2010/0167762 A1* | 7/2010 | Pandey et al. | 455/466 |
| 2010/0246780 A1* | 9/2010 | Bakker et al. | 379/38 |

FOREIGN PATENT DOCUMENTS

| | | |
|---|---|---|
| CN | 101159979 A | 4/2008 |
| EP | 1909451 A1 | 4/2008 |
| EP | 1973289 A1 | 9/2008 |
| EP | 2009934 A1 | 12/2008 |
| WO | WO 2008/055559 A1 * | 5/2008 |

OTHER PUBLICATIONS

Huawei. "SR-VCC with Shared IMPU". 3GPP TSG SA WG2 Meeting #67, TD S2-085649. Aug. 25-29, 2008. 3rd Generation Partnership Project, Sophia Antipolis, France.

* cited by examiner

*Primary Examiner* — Hassan Kizou
*Assistant Examiner* — Tejis Daya
(74) *Attorney, Agent, or Firm* — Coats and Bennett P.L.L.C.

(57) ABSTRACT

A method and apparatus for enabling delivery of a message in a communication system comprising an IMS domain and a circuit switched domain. Upon receiving a registration message in the IMS domain from a user equipment operated by a user, wherein the message comprises an Equipment Identifier valid for the user equipment and an IMPI valid for the user, the Equipment Identifier and the IMPI are extracted from the received message. Then a creation or an update of a mapping of the Equipment Identifier to the IMPI and a C-MSISDN is initiated. Upon receiving a message, relating to the user, which is to be communicate between the IMS and circuit switched domains in the communication system, a use of the mapping for translating between the Equipment Identifier, IMPI and the C-MSISDN is initiated.

9 Claims, 8 Drawing Sheets

METHOD FOR ENABLING DELIVERY OF A MESSAGE BETWEEN AN IMS DOMAIN AND A CS DOMAIN

TECHNICAL FIELD

The present invention relates generally to a method for enabling delivery of a message in a communication system, wherein the communication system comprises a packet switched IMS domain and a circuit switched domain, and an apparatus for executing the method.

BACKGROUND

In the last twenty years, the world has seen a revolution in communications. Twenty years ago, landline telephones were the dominating means for communications. Since then, GSM (Global System for Mobile communication) and its different equivalents or counterparts have become widely used all over the world and also EDGE (Enhanced Data rates for Global Evolution) and UMTS (Universal Mobile Telecommunications System) also known as 3G (Third Generation). Another development is that data communications are merging more and more with mobile telephone communications. These days, surfing the Internet, sending short messages and e-mails using a mobile phone, PDA (Personal Digital Assistant), laptop or the like, away from home and a landline connection, are as natural as making a landline phone call was some twenty or thirty years ago. The technical evolution has been fast and is still ongoing.

A requirement for allowing extensive use of mobile stations, such as a mobile phone, PDA, laptop or the like, for surfing the Internet and using various new services that are constantly evolving, is a high bit rate in the radio interface. A requirement for new services to evolve and for the existing relatively new services to become successful and widely used, is that the bit rate in the radio interface can be increased compared to the communication systems existing or in use today.

A new technique for increasing the bit rate in radio communication is LTE, Long Term Evolution. This technique can be used to provide bit rates around 100 Mbit/s, and perhaps even higher. Working together with LTE is the IP Multimedia Subsystems, IMS. IMS is an architectural framework for delivering Internet Protocol (IP) multimedia services. To ease the integration with the Internet, IMS uses IETF protocols wherever possible, e.g. the Session Initiation Protocol (SIP).

As the different new techniques and services are being developed, it is important that they are also compatible with "old" existing techniques and also that existing services will be supported by the new techniques. For example, today GSM and UMTS systems are compatible and are interworking solutions for communication and a GSM user can interact with a UMTS user without even knowing if the other is using GSM or UMTS.

An example of an old existing service that is to be supported by LTE is SMS (Short Messaging Service). In 3GPP23.204, it is described that all existing SMS capabilities are supported through SMS encapsulation in IP.

In IMS, a user may be reachable on several different user equipments (formerly referred to as mobile stations in GSM and UMTS). In IMS, two different identities are used, IMPI and IMPU. The IMPI (IP Multimedia Private Identity) is unique to a user equipment or subscription and not necessarily to a specific user. The IMPU (IP Multimedia Public Identity) can be shared in more than one user equipment, so that any of them can be reached with the same identity. For example, a single phone-number may be valid for an entire family using plural user equipments. The IMPI and the IMPU are both URIs, for example a tel-uri or a sip-uri. A URI is a Uniform Resource Identifier. A tel-uri may comprise a telephone number and a sip-uri may e.g. comprise an e-mail address. An IMPU is unique to a user, or a user group, having an IMS profile.

The private identity, IMPI, is used, e.g., for authentication during registration, re-registration and de-registration, and it is therefore also stored in an HSS (Home Subscriber Server) node.

The public identity, IMPU, can be used by any services/users to identify a subscriber and/or his/her equipments when participating in IMS sessions.

The problem that arises with existing solutions is that a terminating SIP message is destined to a particular IMS user and not necessarily to a particular device, in case the user has multiple user equipments under the same subscription. For normal chat messages, it may very well be the case that the user would like to have the messages forwarded to all user equipments. But for, e.g., configuration messages, it may even be harmful to forward such messages to user equipments that are not supposed to receive them.

Moreover, the use of SIP implies that a terminating message is received by the SIP application and not by the CS (Circuit Switched) application on the user equipment. Hence in any of the above cases, it is not clear how to ensure that the intended user equipment receives the message, as well as the correct application as such in the terminal, which message may be e.g. an OTA (Over The Air) configuration message.

The solution in IMS today that is used to direct messages to a particular user equipment, is the use of a parameter called GRUU (Globally Routable UA URI). This is not always possible to use, as the notion of GRUU does not exist in the CS world. As a consequence, GRUU would only be possible to employ for networks where IMS is used end-to-end, and it would not be possible to "breakout" to a user equipment that is registered in a CS network. Here, to breakout means to (via a gateway) forward a message to the CS domain.

SUMMARY

It is an object of the invention to address at least some of the problems outlined above. In particular, it is an object of the invention to provide a solution, which enables delivery of a message in a communication system, wherein the communication system comprises a packet switched IMS domain and a circuit switched domain. These objects and other may be obtained by providing a method and an apparatus according to the independent claims attached below.

According to one aspect, a method is defined for enabling delivery of a message in a communication system comprising an IMS domain and a circuit switched domain.

Upon receiving a registration message in the IMS domain from a user equipment operated by a user, wherein the message comprises an Equipment Identifier valid for the user equipment and an IMPI valid for the user, the Equipment Identifier and the IMPI are extracted from the received message. Then a creation or an update of a mapping of the Equipment Identifier to the IMPI and a C-MSISDN is initiated. Upon receiving a message, relating to the user, which is to be communicated between the IMS and circuit switched domains in the communication system, a use of the mapping for translating between the Equipment Identifier, IMPI and the C-MSISDN is initiated.

This has the advantage that the mapping between the EI, IMPI and C-MSISDN is stored during the registration procedure and not erased as an IMS registration is terminated and the registration data in IMS is dropped. As a consequence, the system will be able to communicate messages between the domains to UEs, regardless if the UEs are currently registered in IMS or not.

According to another aspect, an apparatus is provided, which is adapted to enable delivery of a message in a communication system, the system comprising at least an IMS domain and a circuit switched domain. The apparatus comprises a message handling unit adapted to receive a registration message in the IMS domain from a user equipment operated by a user. The message comprises an Equipment Identifier and an IMPI. The apparatus further comprises an extracting unit adapted to extract the Equipment Identifier and IMPI, and a mapping unit adapted to enable creating, updating and storing a mapping in a database, the mapping comprising a C-MSISDN, the Equipment Identifier and the IMPI. The message handling unit is also adapted to receive SIP messages comprising an IMS Public User Identity, a C-MSISDN or an Equipment Identifier; and to initiate translation between said Equipment Identifier and the C-MSISDN using the database when messages relating to the user are communicated between the IMS and circuit switched domains in the communication system.

Different embodiments are possible in the method and apparatus above.

According to an embodiment, when a mapping exists comprising the received IMPI and an Equipment Identifier different from the received Equipment Identifier, the creation or update of a mapping comprises the action of updating the mapping so as to comprise the received Equipment Identifier.

This has the advantage that in case the user has changed user equipments, so as to have taken a SIM-card from one already registered UE and put the SIM-card into another UE, the mapping will be updated so that the user will be reachable on the new UE even when he or she is only reachable in the CS domain.

When a mapping of the Equipment Identifier to the IMPI and a C-MSISDN does not exist, the creation or update of a mapping comprises the actions of discovering a corresponding C-MSISDN and creating a mapping according to the received Equipment Identifier and IMPI, and the corresponding C-MSISDN.

This has the advantage that if it is the first time the user registers in IMS, a mapping will be created and stored so that the user may be reachable even when he or she is only reachable in the CS domain.

The Equipment Identifier may be a GRUU or an IMEI.

According to another embodiment, the step of initiating a use of the mapping when sending messages between the domains in the communication system further comprises the action of receiving a SIP message in an IMS domain, the SIP message comprising an Equipment Identifier as destination address to a user equipment. The step further comprises the actions of initiating a fetching of a mapping between the Equipment Identifier and a C-MSISDN when the addressed user equipment is not currently registered in IMS, a translation of said Equipment Identifier to the C-MSISDN and a conversion of said SIP message to an SMS message. The step also comprises the action of forwarding said SMS message for delivery to the user equipment in the circuit switched domain, based on the C-MSISDN.

According to yet another embodiment, the step of initiating a use of the mapping when sending messages between the domains in the communication system further comprises the actions of receiving a SIP message in an IMS domain, the SIP message comprising an Equipment Identifier as destination address to a user equipment, forwarding the SIP message for delivery to the user equipment in IMS, when the addressed user equipment is currently registered in IMS based on the received Equipment Identifier.

According to an embodiment, the step of initiating a use of the mapping when sending messages between the domains in the communication system further comprises the action of receiving a SIP message in an IMS domain, the SIP message comprising an IMS Public User Identity as destination address to a user. The step also comprises the actions of determining, by analysing the content of the SIP message, whether to send the message to all user equipments associated with the received IMS Public User Identity or to a specific user equipment. If only to send to a specific user equipment, determining the Equipment Identifier(s) of the user equipment(s) the message should be sent to, based on the analysis of the message content. Then, for each EI, initiating a fetching of a mapping between the Equipment Identifier and a C-MSISDN when the addressed user equipment is not currently registered in IMS, a translation of the Equipment Identifier to the C-MSISDN and a conversion of the SIP message to an SMS message, and a forwarding of the SMS message for delivery to the user equipment in the circuit switched domain, based on the C-MSISDN.

In yet a possible embodiment, the step of initiating a use of the mapping when sending messages between the domains in the communication system further comprises the action of receiving a SIP message in an IMS domain, the message comprising a C-MSISDN as destination address to a user equipment. The step further comprises the actions of initiating a fetching of a mapping between the C-MSISDN and an Equipment Identifier when the addressed user equipment is currently registered in IMS, a translation of the C-MSISDN to the Equipment Identifier, and a forwarding of the SIP message to an S-CSCF for delivery to the user equipment based on the Equipment Identifier.

According to another embodiment, the step of initiating a use of the mapping when sending messages between the domains in the communication system further comprises the actions of receiving a SIP message in an IMS domain, the message comprising a C-MSISDN as destination address to a user equipment, initiating a conversion of the SIP message to an SMS message when the addressed user equipment is not currently registered in IMS, and a forwarding of the SMS message for delivery to the user equipment in the circuit switched domain, based on said received C-MSISDN.

BRIEF DESCRIPTION OF THE DRAWINGS

The invention will now be described in more detail by means of exemplary embodiments and with reference to the accompanying drawings, in which.

DETAILED DESCRIPTION

Figure 1:
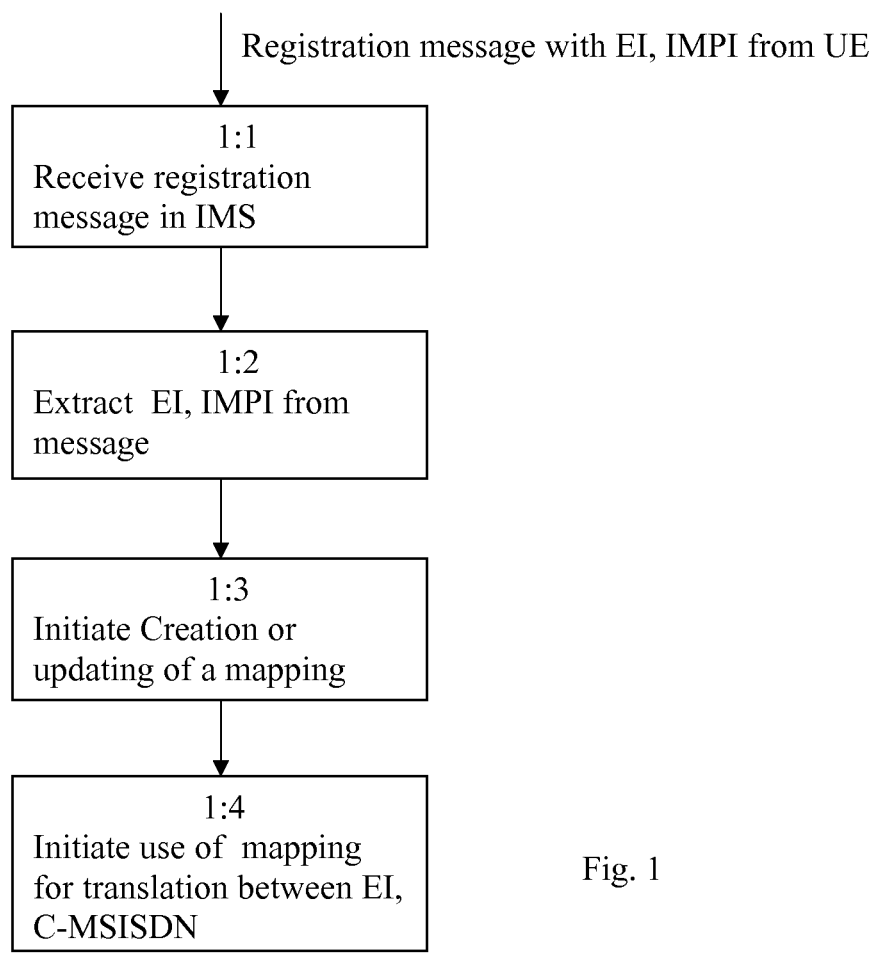
FIG. 1 is a flowchart illustrating an exemplary procedure for enabling delivery of a message in a communication system comprising at least an IMS domain and a circuit switched domain.

Briefly described, the invention provides a method for enabling delivery of a message in a communication system, wherein the communication system comprises a packet switched IMS domain and a circuit switched domain, and an apparatus for executing the method.

The invention will now be described in more detail below by exemplary embodiments of the invention.

A simplified description of how IMS can be used for multimedia services in communication will first be given.

When a user wishes to make use of an IMS service, in other words to create a session, he or she must first register in the IMS. The registration in IMS will entail different actions which are not described here. Briefly, some actions are though sending an IMS registration message from a User Equipment (UE), the message comprising an Equipment Identifier (EI), an IP Multimedia Private Identity (IMPI) and an IP Multimedia Public Identity (IMPU). The network stores the EI, IMPI and IMPU for the duration of the IMS registration.

After the registration, the user makes use of the desired IMS service, such as making a telephone call or sending a message.

When the UE cannot use the IMS domain anymore, it may instead use the circuit switched domain to communicate or make use of available services. At such a time, the UE may not be available in the IMS domain, and it is therefore de-registered in IMS. This means that all data in the CSCFs (Call Session Control Function) for that user are released. This includes removing the information about the UE, such as the EI and IMPI.

An example of how the method for enabling delivery of a message in a communication system comprising an IMS domain and a circuit switched domain can be performed will now be described with reference to the flowchart in FIG. 1. The steps in this procedure can be basically performed by an Application Server (AS) connected to an IMS network. In this example, a registration message is received from a UE in step 1:1. The message comprises at least an EI and an IMPI. The EI is valid for the UE and the IMPI is valid for the user operating the UE. These identities, the EI and IMPI, are extracted from the message in step 1:2. Thereafter, a creation or an updating of a mapping of the EI to the IMPI and also to a C-MSISDN is initiated in a further step 1:3. A C-MSISDN is a Uniform Resource Identifier including an MSISDN (Mobile Subscriber International ISDN Number). The C-MSISDN is generally used in the Circuit Switched (CS) domain as an identifier for a specific UE. Then, this mapping can be used for translating between the EI, IMPI and C-MSISDN whenever messages relating to the user are communicated between the IMS and the CS domain in the communication system.

The mapping between the EI, IMPI and C-MSISDN is thus stored during the registration procedure and not erased as an IMS registration is terminated and the registration data in IMS is dropped. As a consequence, the system will be able to communicate messages between the domains to UEs, regardless if the UEs are currently registered in IMS or not.

The steps in FIG. 1 have been defined basically for execution by the AS, although in practice, step 1:3 results in actions by the database, for example an HSS, as well. An example of how step 1:3 of initiating the creation or the updating of a mapping of the EI to the IMPI and also to a C-MSISDN can be done in practice will now be described in more detail with reference to FIG. 2.

Figure 2:
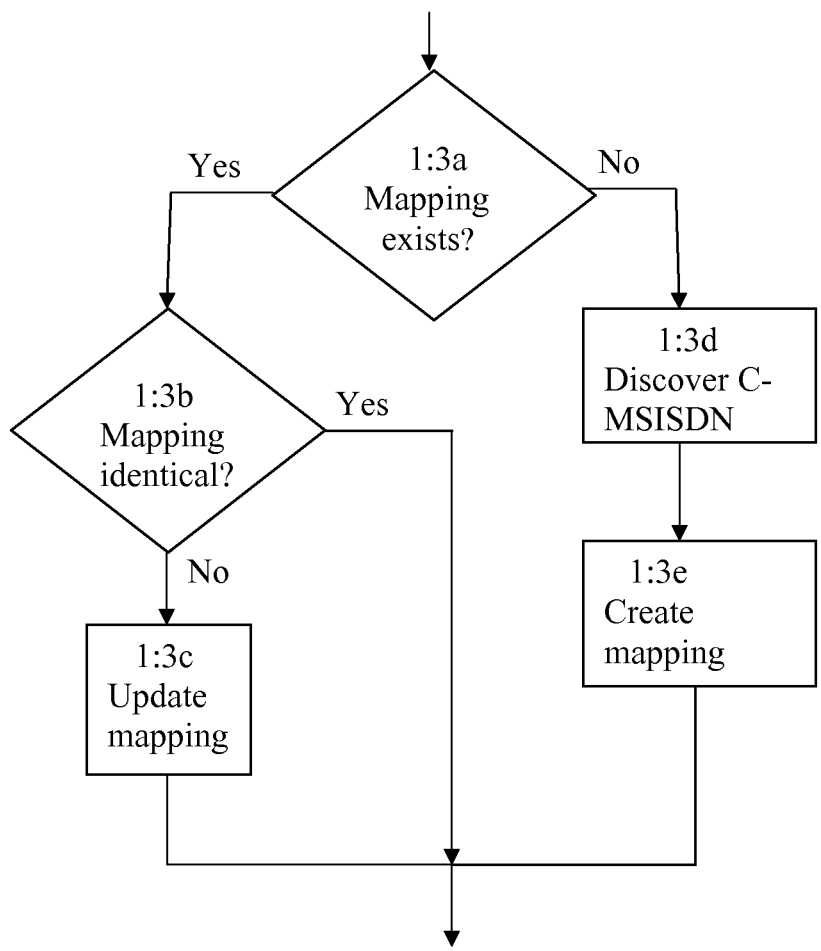
FIG. 2 is a flowchart illustrating an embodiment of the creation or updating of a mapping according to the method.

FIG. 2 is a flowchart illustrating an embodiment of the creation or updating of a mapping according to the method in FIG. 1, performed by the database or HSS. In this embodiment, it is checked in action 1:3a if a mapping comprising the received IMPI exists.

When a mapping already exists comprising the received IMPI, it is checked if the mapping comprising the received IMPI also comprises the received EI in action 1:3b. If a mapping exists but comprises a different EI than the EI that was received in the registration message, the existing mapping is updated in action 1:3c to that it comprises the received EI. The updated mapping will then comprise the received EI and IMPI and the already existing C-MSISDN.

If the mapping exists and it comprises the received IMPI and EI, nothing is done and the mapping remains the same as no updating is necessary.

If a mapping does not exist, a corresponding C-MSISDN is discovered in action 1:3d and then a mapping according to the received Equipment Identifier and IMPI, and the corresponding C-MSISDN is created in action 1:3e.

The C-MSISDN may be discovered in different ways. In principle, there are two possible scenarios, an IP Multimedia Identity Module (ISIM) is used by the UE when registering in IMS or a Universal Subscriber Identity Module (USIM) is used when registering in IMS.

In case an ISIM is used in a card inserted in the UE, the card holding the ISIM, the UICC (Universal Integrated Circuit Card), also holds a USIM for access authentication and the ISIM for IMS authentication. The correlation or mapping between the IMPI and C-MSISDN may in this case take place when initial provisioning is performed. In other words, the operator codes this information into the card as the card is hardcoded.

In case a USIM is used by the UE, the access identity on the card, ISIM, is used to create an IMPI having the format of IMSI@ims.mnc.mcc.3gppnetwork.org. See e.g. 3GPP TS 23.003 paragraph 13.3. By this, it is possible to create a mapping between the IMPI and C-MSISDN for the UE by taking the IMSI from the IMPI and request from the HLR (Home Location Register) part of the HSS which C-MSISDN is associated with the IMSI.

The Equipment Identifier (EI) may be a GRUU (Globally Routable UA URI) or an IMEI (International Mobile Equipment Identity).

Figure 3:
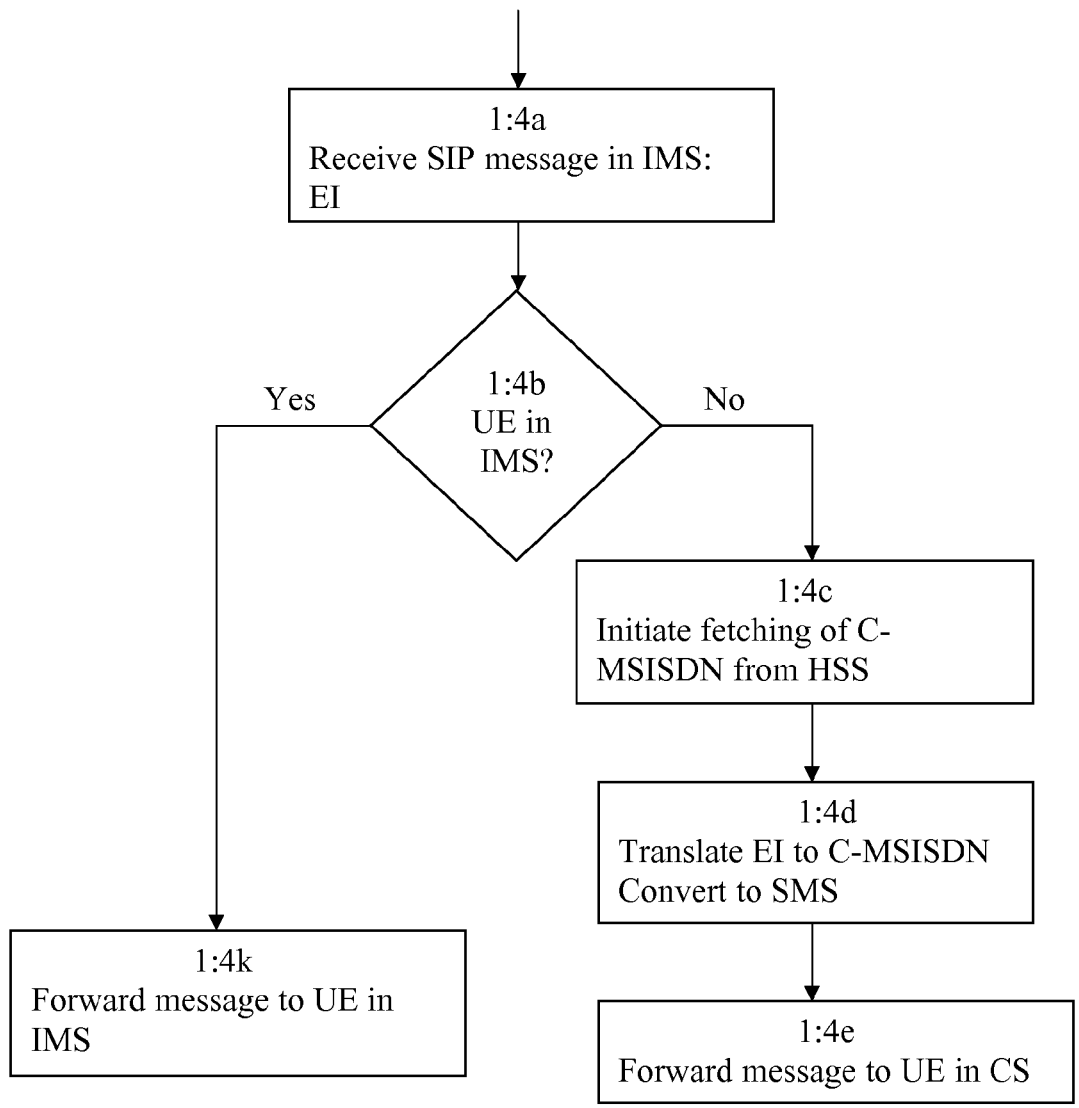
FIG. 3 is a flowchart illustrating an embodiment of step 1:4 according to the method.

An example of performing step 1:4 in FIG. 1 is illustrated in FIG. 3. The step 1:4 of initiating a use of the mapping when sending messages between the domains in the communication system further comprises the actions of receiving 1:4a a SIP message in the IMS domain, wherein the message comprises an EI as destination address to a UE. It is determined whether the addressed user equipment registered in IMS, in action 1:4b. When the addressed UE is not currently registered in IMS, the fetching of the mapping between the EI and a C-MSISDN is initiated in action 1:4c. The received EI is then translated in action 1:4d to the C-MSISDN and the message is converted to an SMS message. Thereafter, the SMS message is forwarded in action 1:4e for delivery to the user equipment in the CS domain, based on said translated C-MSISDN.

As the addressed UE is not registered in IMS, it can only be reached in the CS domain. In the CS domain, the UE cannot be addressed with the received EI. In the CS domain, it may be addressed by its C-MSISDN. By using the mapping between the EI, IMPI and C-MSISDN to translate the EI into the C-MSISDN, it is possible to forward the message to the user in the CS domain after having converted the SIP message into an SMS message.

FIG. 3 also illustrates the case when the received SIP message comprises an EI as destination address to a UE and it is determined in action 1:4b that the UE is currently registered in IMS. In this case, the SIP message can be forwarded to the UE based on the received EI, as shown in action 1:4k.

Figure 4:
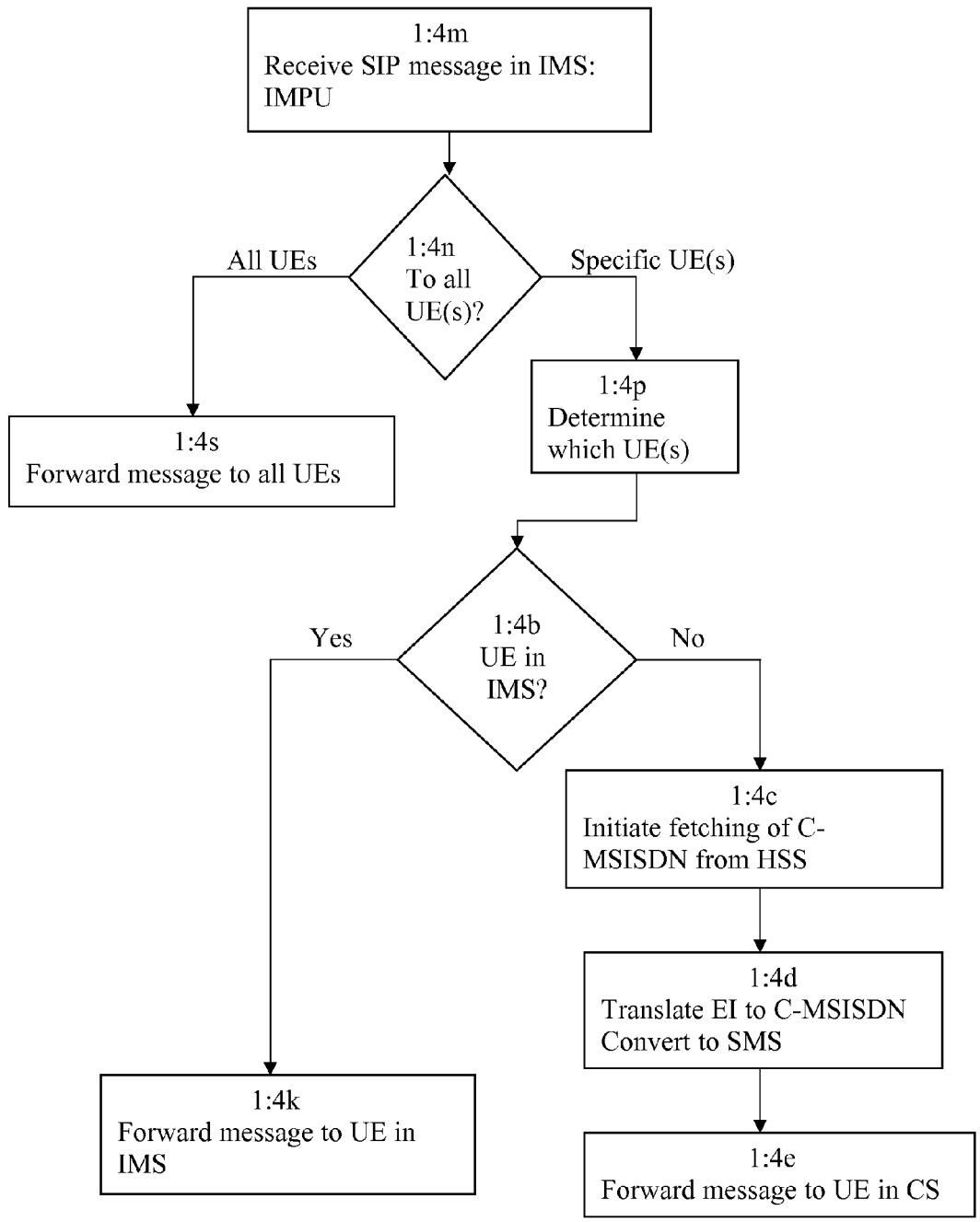
FIG. 4 is a flowchart illustrating a further embodiment of step 1:4.

FIG. 4 is a flowchart illustrating another exemplary embodiment of executing step 1:4, when a SIP message is received in the IMS domain in action 1:4m, wherein the message comprises an IMS Public User Identity as destination address to a user. It is determined in action 1:4n, by analysing the content of the SIP message, whether to send the message to all user equipments associated with said received IMS Public User Identity or to a specific UE.

If only to send the message to a specific UE, it is determined in action 1:4p the Equipment Identifier(s) of the user equipment(s) the message should be sent to, based on the analysis of the message content. When to send the message to specific user equipment(s), the same procedures apply as for FIG. 3 as how to translate an Equipment Identifier to a C-MSISDN and to route such a message to the CS domain, when the addressed UE(s) is/are not registered in IMS. For each EI, actions 1:4b-1:4e and 1:4k are thus performed.

In case to send the message to all UEs, the message is forwarded to all UEs, as shown in action 1:4s.

Figure 5:
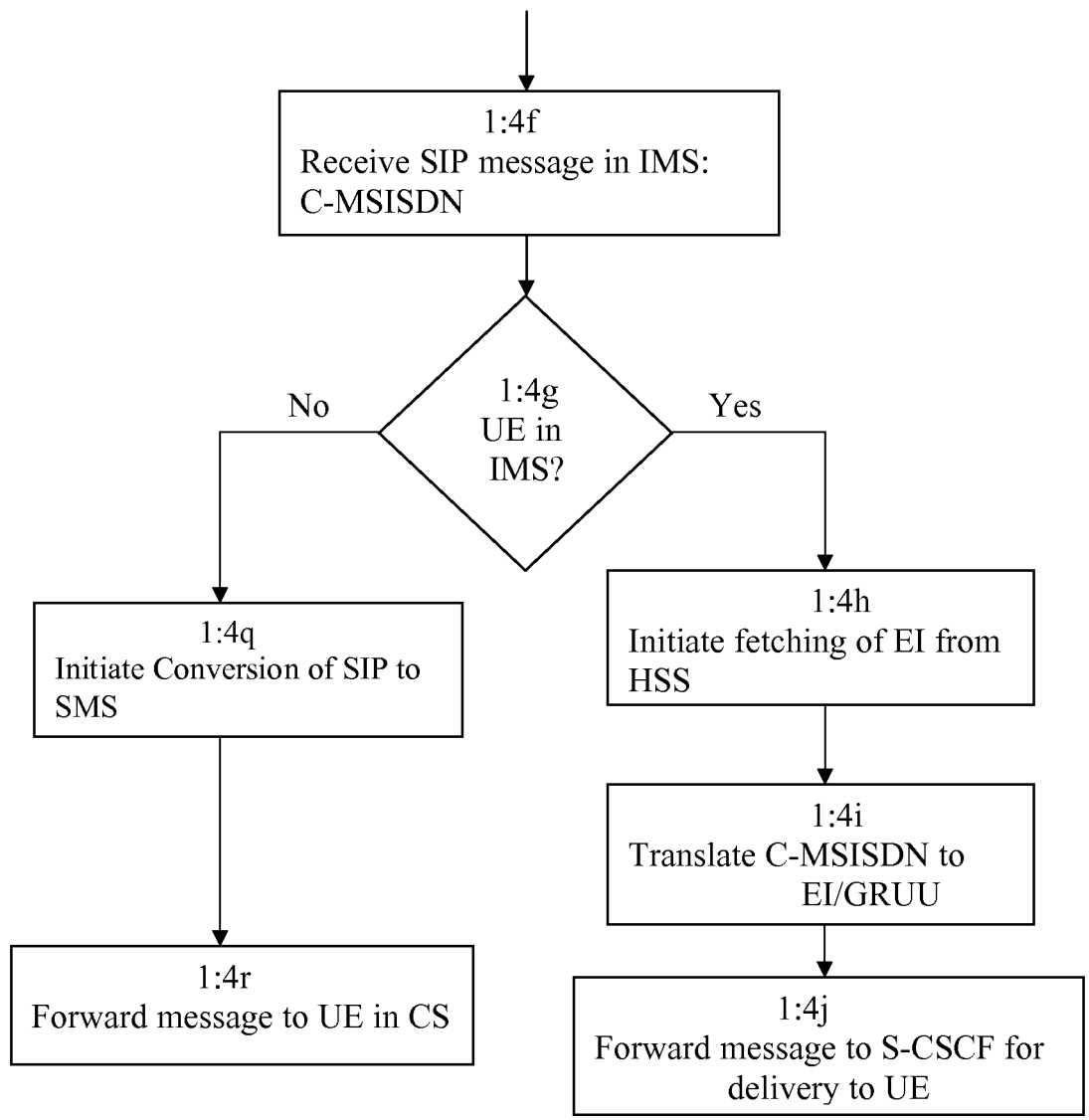
FIG. 5 is a flowchart illustrating another embodiment of step 1:4 according to the method.

Turning to FIG. 5, another example of executing step 1:4 in FIG. 1 is illustrated. In this example, a SIP message is received in the IMS domain in action 1:4f, wherein the message comprises a C-MSISDN as destination address to a UE.

It is determined whether the addressed UE is registered in IMS in action 1:4g. When the addressed UE is currently registered in IMS, the fetching of a mapping between the C-MSISDN and an EI is initiated in action 1:4h and the C-MSISDN is translated to the EI in action 1:4i. Thereafter, the SIP message is forwarded in action 1:4j to an S-CSCF for delivery to the UE based on the translated EI.

When a UE is registered in IMS, it cannot be reached by means of the C-MSISDN. In this case, the C-MSISDN must be translated to an EI in order to be delivered in the IMS domain. As the received message is a SIP message and the addressed UE is currently registered in IMS, the SIP message can be forwarded as a SIP message.

FIG. 5 also illustrates that, in case it is determined in action 1:4g that the addressed UE is not registered in IMS, the conversion of the received SIP message into an SMS message is initiated in action 1:4q and forwarded in action 1:4r for delivery to the UE in the circuit switched domain, based on said received C-MSISDN.

In case a SIP message is received comprising a C-MSISDN as destination address to a UE and the UE is not currently registered in IMS, the message needs to be forwarded to the CS domain. As the message is a SIP message, which is not understood in the CS domain, the message has to be converted into an SMS message. As the destination address is already a C-MSISDN, the destination address is understood by the CS domain and can be used as destination address in the SMS message.

Figure 6:
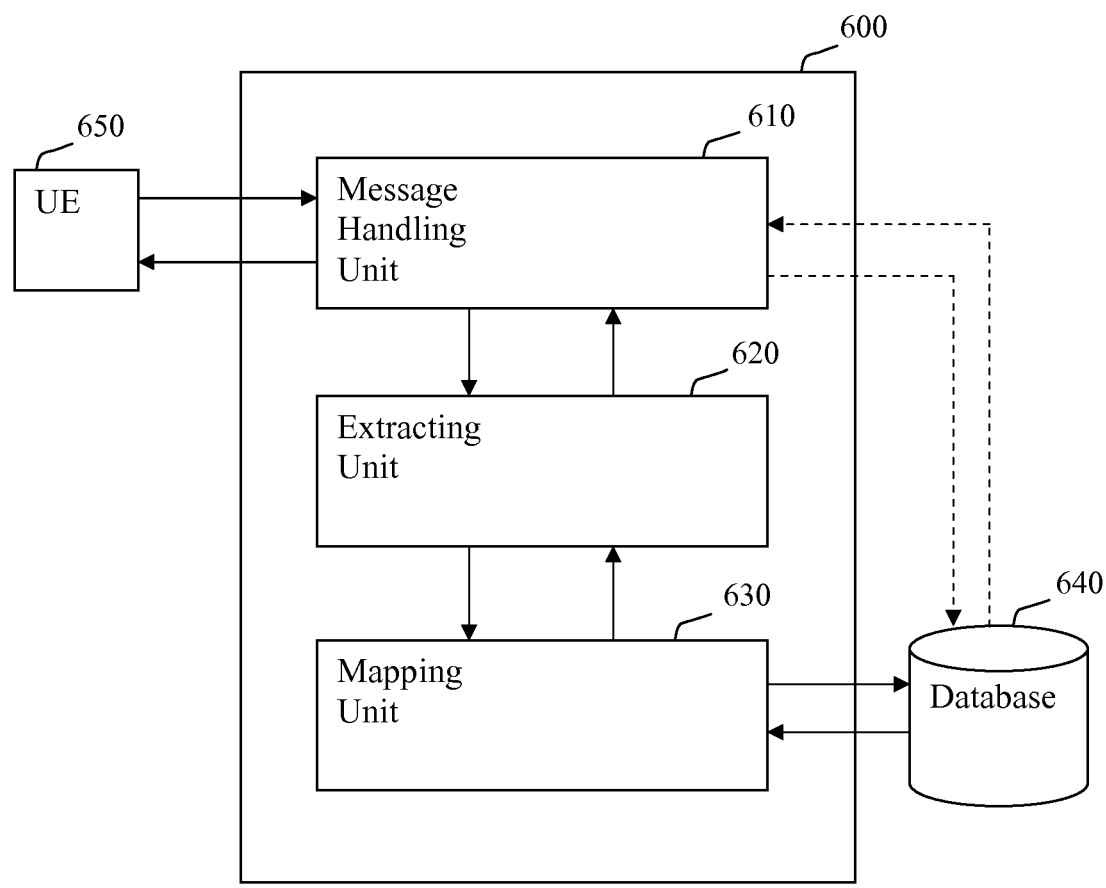
FIG. 6 illustrates a logical representation of an apparatus for enabling delivering a message in a communication system.

FIG. 6 illustrates a logical representation of an apparatus for enabling delivery of a message in a communication system, the system comprising an IMS domain and a CS domain. The apparatus may for example be implemented in an Application Server.

The apparatus has similar or the same advantages and objects as the above described method and they are not all described again below.

In this example, the apparatus 600 comprises a message handling unit 610 adapted to receive a registration message in the IMS domain from a UE 650 operated by a user, wherein the message comprises an EI and an IMPI. The apparatus 600 also comprises an extracting unit 620 which is adapted to extract the Equipment Identifier and IMPI, and a mapping unit 630 which is adapted to enable creating, updating and storing a mapping in a database 640, wherein the mapping comprises a C-MSISDN, the Equipment Identifier and the IMPI.

The message handling unit 610 is further adapted to receive SIP messages comprising an IMS Public User Identity, a C-MSISDN or an Equipment Identifier of a UE 650; and to initiate translation between the Equipment Identifier and the C-MSISDN using the database 640 when messages relating to the user are communicated between the IMS and CS domains in the communication system.

According to an example of the apparatus 600, the messaging handling 610 unit is further adapted to, when a received SIP message comprises an Equipment Identifier as destination address to a user equipment 650, initiate a fetching of a mapping between a C-MSISDN and the Equipment Identifier from the database 640 when the addressed user equipment 650 is not registered in IMS, a translation of the Equipment Identifier to the C-MSISDN and a conversion of the SIP message to an SMS message, and a forwarding of the SMS message for delivery to the user equipment 650 in the circuit switched domain based on the translated C-MSISDN.

According to another example of the apparatus 600, the messaging handling unit 610 is further adapted to, when a received SIP message comprises an EI as destination address to a UE 650, forward the SIP message for delivery to the UE 650 in IMS, when the addressed UE 650 is currently registered in IMS based on the received EI.

According to yet another example of the apparatus 600, the messaging handling unit 610 is further adapted to, when the SIP message is received and it comprises an IMS Public User Identity as destination address to a user, determine whether to send to all UEs associated with the received IMS Public User Identity or only to a specific UE 650 by analysing the content of the received SIP message, and if only to send to a specific UE, determine the EI(s) of the UE(s) the message should be sent to based on the analysis of the message content.

According to an example of the apparatus 600, the messaging handling unit 610 is further adapted to, when the received SIP message comprises a C-MSISDN as destination address to a user equipment 650, initiate a fetching of a mapping between the C-MSISDN and an Equipment Identifier when the addressed user equipment 650 is registered in IMS, a translation of the C-MSISDN to the Equipment Identifier, and a forwarding of the SIP message to a S-CSCF for delivery to the user equipment 650 based on the translated Equipment Identifier.

The message handling unit 610 of the apparatus 600 may further be adapted to, when the received SIP message comprises a C-MSISDN as destination address to a UE 650, initiate a conversion of the SIP message to an SMS message when the addressed user equipment 650 is not currently registered in IMS, and a forwarding of the SMS message for delivery to the user equipment 650 in the circuit switched domain based on the received C-MSISDN.

Figure 7:
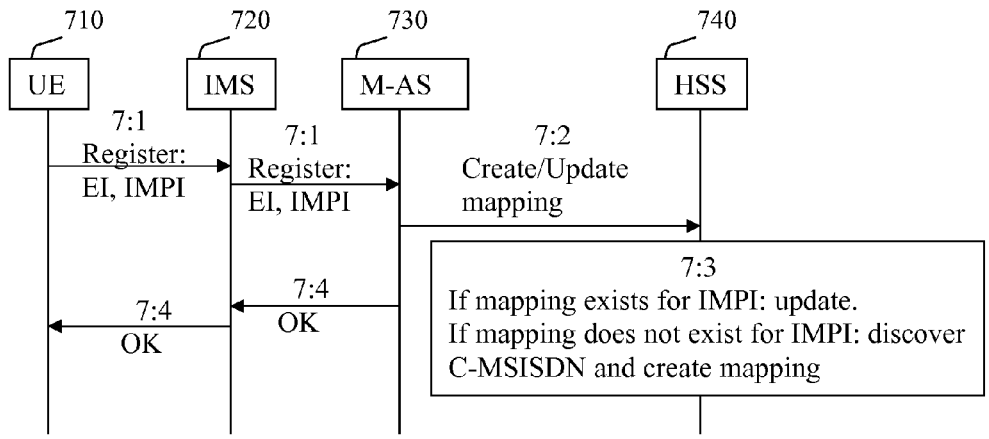
FIG. 7 is a signalling diagram illustrating an exemplary procedure for a registration in IMS.

FIG. 7 is a signalling diagram illustrating an exemplary procedure for a registration procedure in IMS.

In FIG. 7, a UE 710 sends a registration message 7:1 comprising an EI and an IMPI to the IMS domain 720. An application server (AS) 730 orders the creation or an update 7:2 of a mapping in an HSS 740. If mapping exists for the IMPI, but comprises a different EI than the EI that was received in the registration message, the existing mapping is updated to comprise the received EI together with the IMPI and a C-MSISDN. If a mapping does not exist, the C-MSISDN is discovered and then a mapping according to the received Equipment Identifier and IMPI, and the corresponding C-MSISDN is created. The registration is also acknowledged 7:4 to the UE 710 by the AS 730.

Figure 8:
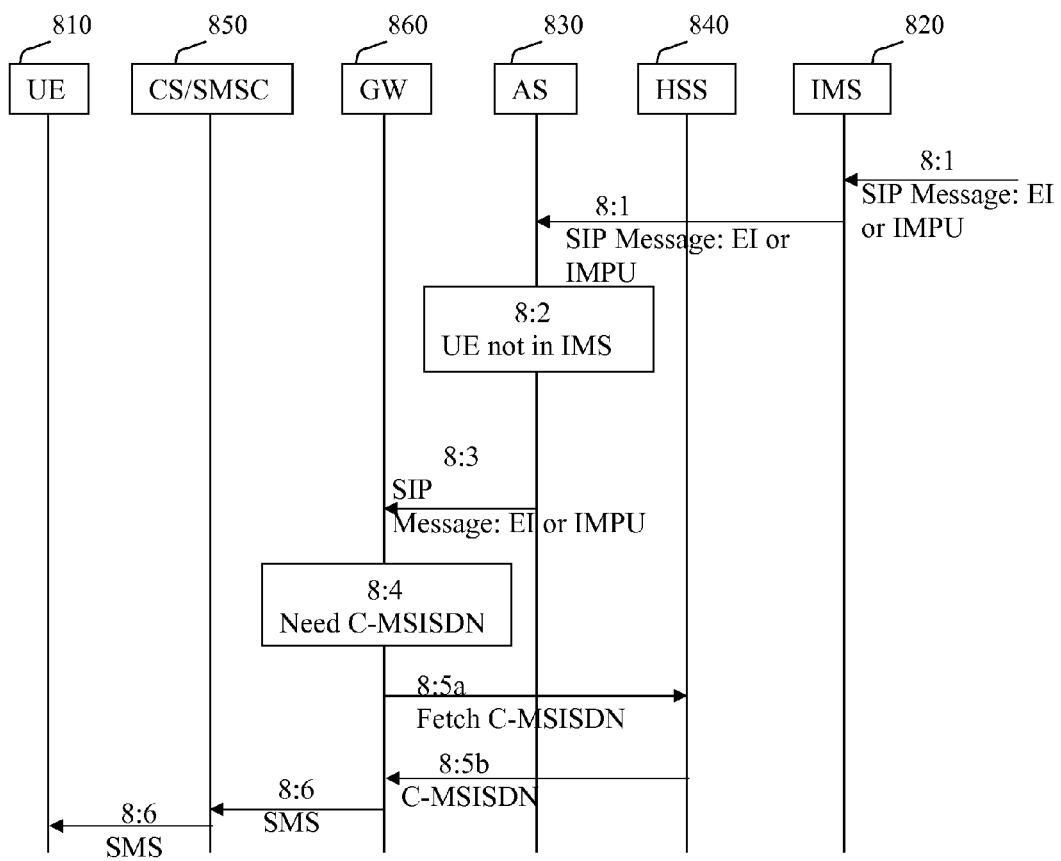
FIG. 8 is a signalling diagram illustrating an exemplary procedure for delivering a message to a user equipment.

FIG. 8 is a signalling diagram illustrating an exemplary procedure for delivering a message to a UE 810 in a communication system comprising an IMS domain 820 and a CS domain 850.

A SIP message comprising an EI, such as a GRUU, or an IMS Public User Identifier is received 8:1 in the IMS domain 820. The EI is a destination address to a UE 810. The message is handled by the AS 830 which checks whether the addressed UE 810 is registered in IMS 820. If the UE is not registered 8:2 in IMS 820, the AS 840 forwards 8:3 the message to a gateway (GW) 860. If the SIP message comprises an IMPU, the GW may first determine if the message shall be sent to one or more UEs, and determine the respective EI(s). The GW determines 8:4 that the C-MSISDN is needed as the destination address is an EI, which is not understood in the CS domain 850. The GW 860 fetches 8:5a, 8:5b the C-MSISDN from the HSS 840. The GW 860 converts the message to an SMS message and translates the EI to the C-MSISDN and then forwards 8:6 the SMS message for delivery to the intended UE 810 based on the C-MSISDN.

Figure 9:
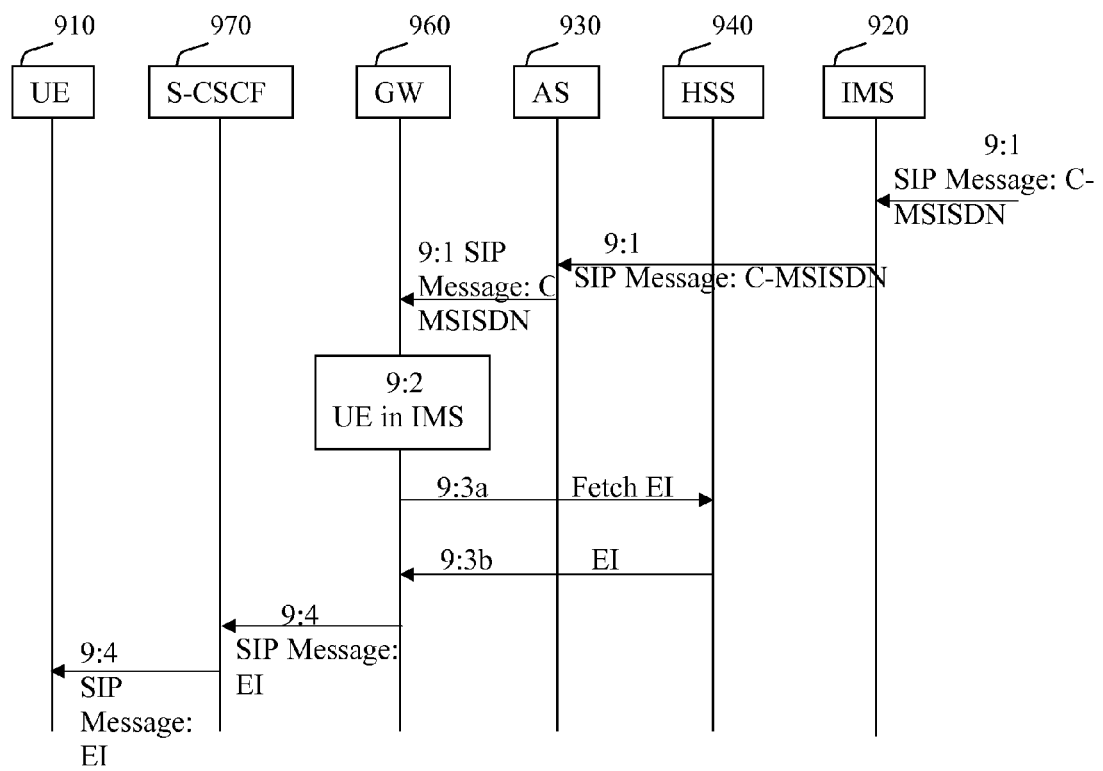
FIG. 9 is a signalling diagram illustrating another exemplary procedure for delivering a message to a user equipment.

FIG. 9 is a signalling diagram illustrating another exemplary procedure for delivering a message to a UE.

An incoming SIP message comprising a C-MSISDN is received 9:1 in IMS 920. The C-MSISDN is the destination address to a UE 910. The message is forwarded 9:1 to a gateway 960, which checks 9:2 if the addressed UE is currently registered in IMS 920. In case the addressed UE 910 is currently registered in IMS 920, the C-MSISDN must be translated to an EI that can be understood by the IMS domain 920. The gateway 960 fetches 9:3a, 9:3b a mapping between these identities from the HSS 940 and translates the destination address from the C-MSISDN to the EI and forwards 9:4 the SIP message to a S-CSCF 970 for delivery to the addressed UE 910 based on the translated EI.

FIGS. 8 and 9 are to be regarded as examples of a message delivery procedure. For example, in FIGS. 8 and 9, the application server 830, 930 and the gateway 860, 960 are illustrated as two separate nodes. However, these two nodes may very well be joined in one node only.

While the invention has been described with reference to specific exemplary embodiments, the description is generally only intended to illustrate the inventive concept and should not be taken as limiting the scope of the invention. The present invention is defined by the appended claims.

The invention claimed is:

1. A method for enabling delivery of a message in a communication system comprising an IP Multimedia Subsystem (IMS) domain and a circuit switched domain, the method comprising:

receiving a registration message in the IMS domain from a user equipment operated by a user, the message comprising an Equipment Identifier valid for the user equipment and an IP Multimedia Private Identity (IMPI) valid for said user, extracting the Equipment Identifier and the IMPI from the received message; initiating one of a creation and an update of a mapping of said Equipment Identifier to said IMPI and a Correlation Mobile Subscriber International ISDN Number (C-MSISDN); and initiating a use of the mapping for translating between said Equipment Identifier, the IMPI and the C-MSISDN when messages relating to the user are communicated between the IMS and circuit switched domains in the communication system.

2. The method according to claim 1, wherein when the mapping comprises said received IMPI and a different Equipment Identifier from said Equipment Identifier received in said registration message, the method comprising updating said mapping to comprise said received Equipment Identifier.

3. The method according to claim 1, wherein the creation of said mapping of said Equipment Identifier to said IMPI and said C-MSISDN comprises discovering the C-MSISDN that corresponds to the Equipment Identifier and creating said mapping according to the received Equipment Identifier and IMPI, and the corresponding C-MSISDN.

4. The method according to claim 1, wherein said Equipment Identifier is one of a Globally Routable User Agent Uniform Resource Identifier (GRUU) and an International Mobile Equipment Identity (IMEI).

5. The method according to claim 1, wherein initiating the use of said mapping for translating between said Equipment Identifier, said IMPI and said C-MSISDN when messages relating to said user are communicated between said IMS and circuit switched domains in said communication system further comprises:

receiving a Session Initiation Protocol (SIP) message in the IMS domain, said SIP message comprising the Equipment Identifier as destination address to the user equipment;

when the user equipment is not currently registered in the IMS domain, fetching the mapping between the Equipment Identifier and the C-MSISDN, translating said Equipment Identifier to the C-MSISDN and converting said SIP message to an Short Messaging Service (SMS) message, and forwarding said SMS message for delivery to the user equipment in the circuit switched domain, based on the C-MSISDN.

6. The method according to claim 1, wherein initiating the use of said mapping for translating between said Equipment Identifier, said IMPI and said C-MSISDN when messages relating to said user are communicated between said IMS and circuit switched domains in said communication system further comprises:

receiving a SIP message in the IMS domain, said SIP message comprising the Equipment Identifier as destination address to the user equipment;

when the user equipment is currently registered in the IMS domain based on said Equipment Identifier, forwarding said SIP message for delivery to the user equipment in the IMS domain.

7. The method according to claim 1, wherein initiating the use of said mapping for translating between said Equipment Identifier, said IMPI and said C-MSISDN when messages relating to said user are communicated between said IMS and circuit switched domains in said communication system further comprises:

receiving a SIP message in the IMS domain, said SIP message comprising an IMS Public User Identity as destination address to the user;

determining, by analyzing the content of the SIP message, whether to send the SIP message to a plurality of user equipment including the user equipment that are associated with said received IMS Public User Identity or just to the user equipment;

when the SIP message is to be sent to just the user equipment, determining the Equipment Identifier of the user equipment;

when the user equipment is not currently registered in the IMS domain, fetching the mapping between the Equipment Identifier and the C-MSISDN, translating said Equipment Identifier to the C-MSISDN and converting said SIP message to an SMS message, and forwarding said SMS message for delivery to the user equipment in the circuit switched domain, based on the C-MSISDN.

8. The method according to claim 1, wherein initiating the use of said mapping for translating between said Equipment Identifier, said IMPI and said C-MSISDN when messages relating to said user are communicated between said IMS and circuit switched domains in said communication system further comprises:

receiving a SIP message in the IMS domain, said message comprising a C-MSISDN as destination address to the user equipment;

when the user equipment is currently registered in the IMS domain, fetching the mapping between the Equipment Identifier and the C-MSISDN, translating said C-MSISDN to said Equipment Identifier, and forwarding said SIP message to an Serving Call Session Control Function (S-CSCF) for delivery to the user equipment based on the Equipment Identifier.

9. The method according to claim 1, wherein initiating the use of said mapping for translating between said Equipment Identifier, said IMPI and said C-MSISDN when messages relating to said user are communicated between said IMS and circuit switched domains in said communication system further comprises:

receiving a SIP message in the IMS domain, said message comprising a C-MSISDN as destination address to the user equipment;

when the user equipment is not currently registered in the IMS domain, initiating a conversion of said SIP message to an SMS message, and forwarding said SMS message for delivery to the user equipment in the circuit switched domain, based on said received C-MSISDN.

* * * * *